United States Patent [19]

Ishida et al.

[11] Patent Number: 5,141,366
[45] Date of Patent: Aug. 25, 1992

[54] METHOD OF IMPROVING GROUND AND APPARATUS USED THEREFOR

[75] Inventors: Mitsuji Ishida; Tomohiro Sakurada; Katsuhiko Kurihara, all of Yokohama; Takashi Miki, Tokyo; Goro Murai, Yokohama, all of Japan

[73] Assignee: Nitto Chemical Industry Co., Ltd., Tokyo, Japan

[21] Appl. No.: 592,384

[22] Filed: Oct. 3, 1990

[30] Foreign Application Priority Data

Oct. 4, 1989 [JP] Japan .................................. 1-257918

[51] Int. Cl.⁵ .............................................. C09K 17/00
[52] U.S. Cl. ................................... 405/263; 405/266; 405/269
[58] Field of Search ................. 405/36, 38, 50, 222, 405/223, 258, 263, 264, 269

[56] References Cited

U.S. PATENT DOCUMENTS

| | | | |
|---|---|---|---|
| 4,063,424 | 12/1977 | Takagi et al. | 405/222 X |
| 4,072,017 | 2/1978 | Shiraki | 405/269 X |
| 4,643,617 | 2/1987 | Kanno et al. | 405/222 |
| 4,786,212 | 11/1988 | Bauer et al. | 405/269 |

Primary Examiner—Dennis L. Taylor
Attorney, Agent, or Firm—Lowe, Price, LeBlanc & Becker

[57] ABSTRACT

A method of improving water retention characteristics of soil by using water absorption polymer, including the steps of forming a water impermeable layer in a subsurface layer of the ground, and providing a water absorption polymer layer in an upper region of the water impermeable layer. The method is executed by an apparatus for forming a water impermeable layer in a subsurface layer of the ground, the apparatus also being used to mix water absorption polymer in the soil in an upper region of the water impermeable layer, by an injecting apparatus having a drilling function.

9 Claims, 8 Drawing Sheets

METHOD OF IMPROVING GROUND AND APPARATUS USED THEREFOR

BACKGROUND OF THE INVENTION

1. Field of the Invention

This invention relates to a method of improving the ground and an apparatus used therefor to improve water retention characteristics of soil.

More particularly, the invention relates to a method of improving the ground and an apparatus used therefor which has the steps of forming a water impermeable layer in the lower layer of the ground and mixing a water absorption polymer in the soil of the region of the upper layer of the water impermeable layer.

2. Description of the Prior Art

In a dry district such as a desert zone or the like, the water content is insufficient in an environment in which plants are difficult to be bred.

In the dry district, the concentration of salts dissolved out from soil in underground water tends to be increases. Not only ground surface water but underground water moved to the ground surface by a capillary phenomenon are lose their water content by evaporation, and salts contained therein remain on the ground surface. Even if a part of the salts on the ground surface is dissolved in rainy water and again dissolved in the underground water, it is repeatedly moved to the ground surface with underground water to be moved by the capillary phenomenon. Thus, since the evaporated amount of the water content on the ground surface is much, the salts remain and accumulate on the ground surface so that the breeding of plants is disabled with salt detriments.

In a dried sand soil zone such as a sand dune, sand dusts are easily generated by wind power, and the ground configuration is varied thereby.

Heretofore, in order to prevent sand dust, means such as sand preventive forest, sand preventive bank is provided. However, these means necessitates a large quantity of labor, cost and time, but the effect is limited.

On the other hand, a number of techniques for accelerating bleeding of plants by utilizing water retention characteristics of a water absorption polymer have been proposed as shown in, for example, Japanese Patent Laid-Open (KOKAI) Nos. 58-76005, 57-33508, 57-79802, 58-149604, 58-155005, 59-34822, 59-48007, 60-188003, 62-201523.

However, all of these techniques are to aid supplementation of water content by mixing a water absorption polymer with soil in a range affecting the roots of plants.

There is no known technique for breeding plants by forming a water impermeable layer in the lower layer of the ground and interrupting the movement of underground water of high concentration of salts to the ground surface to thereby prevent salt detriments.

SUMMARY OF THE INVENTION

The general object of the present invention is to provide a method of improving the ground and an apparatus adapted to be used therefor which aid in the supplementation of water content necessary to breed plants, by interrupting movement of underground water of high concentration of salts to the ground surface to prevent soil deterioration in a dry district, thereby preventing said and dust formation and accelerating breeding of plant.

The present invention features a method of improving the ground with a water absorption polymer for enhancing water retention characteristics of soil of a dry zone, comprising the steps of forming a water impermeable layer in a lower layer of the ground and mixing a water absorption polymer in the upper layer of said water impermeable layer.

The present invention also features an apparatus for improving the ground to be used to form a water impermeable layer in a lower layer of the ground and to mix a water absorption polymer in soil of the region of the upper layer, of said water impermeable layer comprising at least two independent passages provided in an injection tube in communication with the outside at their proximal ends, wherein one end of the first passage of said passages is opened sidewise for the direction of injecting and one end of the second passage is opened sidewise for the direction of injecting at the position near the proximal end at a distance of at least 0.7 m from said opening of the first passage, an agitating wing projecting sidewise provided near the opening of the second passage, and an injection tube installing device having a power mechanism for rotating and vertically moving the injection tube.

According to the method of the present invention, supplementation of water content necessary to breed plants can be aided while preventing salt detriments in a dry distinct to prevent sand and dust increases in a sandy soil zone and to accelerate the breeding of plants in the dry district.

According to the method and the apparatus in the present invention, a material to be gelled in the ground is injected in the layer in a desired depth in the ground to form a water impermeable layer, and a powder-like water absorption polymer is also injected in the soil of the region of the upper layer of the water impermeable layer to form a water absorption polymer/mixed soil layer corresponding to a water retention characteristic improving layer in the present invention in parallel, simultaneously, without removing soil in the region of the upper layer, thereby improving the operating efficiency and efficiently executing it.

The present invention will be described hereinafter.

The concentration of salts in underground water can be suppressed to a low value by forming a water impermeable layer in a lower layer of the ground to interrupt movement of underground water having a high concentration of salts to the ground surface, holding fallen rail water in the upper layer of the formed water impermeable layer to artificially form an underground-water layer, and reducing soil thickness of the upper layer of the artificial underground-water layer to reduce the quantity of dissolved salts from soil.

In the method of the present invention, the water impermeable layer is preferably formed at a depth of 2 to 10 m from the ground surface.

In the method of the present invention, the material used to form the water impermeable layer is not particularly limited if it is gelled in soil to exhibit water impermeable properties (hereinafter referred to as "a water impermeable material") and is applicable by an injecting process. Such materials include, for example, various cements such as Portland cement, blast furnace cement, colloidal cement, alumina cement, jet cement, polymer cement, etc.; clays such as kaolinite clay, montmorillonite clay, allophane clay, etc.; and various chemicals used to stabilize the ground such as liquid glass, acrylamide, urea-formaldehyde condensate, etc.

They are injected in the ground in a suitable state, such as suspension, solution, etc.

In the case of the chemical used to stabilize the ground, in order to improve impregnation into sandy soil, its gelling time is adjusted to be longer, and it is injected in a one-liquid type flow mixed with main agent and curing agent. The gelling time is preferably adjusted to be in the range approximately 5 to 60 min.

The water impermeable layer to be formed in the lower layer of the ground may be flat in the case of improving a wide area of the ground. In the case of partly improving, and particularly in the case of the region under severe conditions such as a desert zone, the water impermeable layer to be formed is capable of being formed in the form of an underground dam by an underground continuous wall process. In this case, a method using a high pressure jet process, a injecting apparatus with an agitating blade which are ordinarily used is capable of being employed as a method of improving soft ground, as shown in for example Japanese Patent Publication Nos. 48-25768, 51-8493, and 56-44206.

The water absorption polymer used in the method of the present invention includes various powder-like water absorption polymers such as, for example, polyacrylic acid, carboxymethycellulose, isobutylene-maleate copolymer, vinyl acetate-acrylate ester copolymer saponifier, arginate and the like.

The modes of using water absorption polymer in the method of the present invention are as below, and any of these mode or combination or them can be employed.

As an example of the mode of using water absorption polymer, a water absorption polymer layer corresponding to a water retention characteristic improving layer in the present invention is provided in the upper layer of the formed water impermeable layer. The thickness of the water absorption polymer layer is at least 0.5 cm.

As another example of the mode of using water absorption polymer, water absorption polymer is mixed with the soil of the region of the upper layer of the formed water impermeable layer, thereby forming a water absorption polymer mixed soil layer corresponding to a water retention characteristic improving layer according to the present invention.

The quantity of using water absorption polymer is 0.01 to 0.5 pts. wt. to 100 pts. wt. of soil and more preferably 0.1 to 0.3 pts. wt. when it is mixed with soil of the range affecting the roots of plants. It is in a quantity exceeding 0.5 pts. wt. to 100 pts. wt. of soil when it is mixed with soil of the layer in depth exceeding 1 m from the ground surface.

It is further preferable to cover the surface of the soil layer mixed with the water absorption polymer with soil. Plant seeds sheets including plant seeds, manure, soil improving agent, etc. can be disposed on the surface of the soil layer.

An apparatus for improving the ground adapted to perform the above-mentioned object to be used for carrying out the method of the present invention will now be described.

This apparatus is an injecting apparatus capable of drilling the ground by using an injection tube rotatable and vertically movable in the ground, and comprises an injection tube end device (hereinafter referred to as "an end device", having the structure described below, at the end of the injecting apparatus.

The end device is a cylinder having an injection opening opened axially of the cylinder at the distal end of the end device (hereinafter referred to as "an end injection opening"), injection openings opened sidewise at least at two positions of different axial directions at a (lower) position near the distal end side and at a (upper) position near the proximal end side at the sidewall thereof (hereinafter referred to as "a lower injection opening" and "an upper injection opening"), at least two independent passages communicating with the injection openings, respectively and an agitating wing at the sidewall at a position near the upper injection opening. Cutting blades are respectively attached to the endmost end of the end device and the agitating wing.

The number of the lower injection openings or the upper injection openings provided at the end device of the apparatus of the present invention is not limited to one, but a plurality of injection openings may be provided. When a plurality of injection openings is provided, they may be provided at the same axial position, or at different axial positions. In any case, it is preferable to isolate the lower and upper injection openings by 0.7 m or longer at the levels (on the axis)

In the method of the present invention, since the thickness of the water impermeable layer to be formed in the ground is at least 0.7 m, it is preferable to isolate the distance for raising the injection tube at least 0.7 m while injecting the water impermeable material.

According to the method of the present invention, the injection tube attached with the end device having the structure as described above is inserted into a desired position in the ground, rotated to be lifted at a suitable distance while agitating soil around the end device by the agitating wing and injecting the water impermeable material from the lower injection opening and the water absorption polymer from the upper injection opening into the ground respectively, to form a water impermeable layer in the lower layer part and to mix the water absorption polymer into the soil in the upper layer part in a columnar region around the injection tube in the ground.

The injected water impermeable material is solidified in response to its gelling time to form a solidified body together with sand in the region impregnated with the water impermeable material, thereby forming the water impermeable layer.

The above operation is sequentially repeated at adjacent positions in the ground to be improved, to continuously form the water impermeable layer in the lower layer of the ground and the water absorption polymer mixed soil layer in the region of the upper layer simultaneous and in parallel.

In the formation of the water impermeable layer, since sandy soil layer is contained generally in a large amount in a dry zone so that the difference of the rough and fine densities of the ground is large, there is a trend that the water impermeable material is injected only into air gaps around the injection tube but does not significantly spread into the ground around the injection tube so that it is difficult to form the water impermeable layer in the region to be improved.

In one embodiment of the method of the present invention, in injecting the water impermeable material in the ground a high pressure jet stream is employed. The high pressure jet stream may contain only with a liquid or may contain an air and liquid mixture stream formed with high pressure air. In order to inject the water impermeable material into a desired region in the ground as uniformly and efficiently as possible, it is preferable to inject the liquid containing a water impermeable material together with high pressure air.

A powder-like water absorption polymer is injected into the ground with high pressure air. Thus, the air necessary for plants can be supplied together with the water absorption polymer into the soil.

The diameters of the water impermeable layer and the water absorption polymer mixed soil layer formed in the ground can be adjusted according to the injecting pressure of the water impermeable material and the water absorption polymer, i.e., the injecting material, and a large scale of formation can be efficiently performed by enhancing the injecting pressure.

The injection pressure of the injecting material is ordinarily in the range of 100 to 1000 kg/cm$^2$ and, more preferably, in the range of 100 to 500 kg/cm$^2$.

Generally, in an injection system with high pressure injection using high pressure air, since the soil around the jet stream tube is disintegrated and agitated by the jet stream itself, it is not particularly necessary to provide an agitating wing at the injection tube. However, in sandy soil layer in a dry zone, the result of the object of the present invention cannot be obtained if the normal injection tube having no agitating wing is employed.

According to the method of the present invention, the water absorption polymer can be mixed to be scattered even further into the soil by injecting the water absorption polymer by using high pressure air while agitating to collapse the soil around the injection tube by using the injection tube having the agitating wing.

According to the method of the present invention as described above, the travel distance of the material to be injected in the ground can be remarkably increased as compared with the case using the apparatus having no agitating wing and with the case where the high pressure air is not used even in the sandy soil layer.

These and other objects and features of the present invention will become apparent from the following detailed description taken in conjunction with the attached drawings.

BRIEF DESCRIPTION OF THE DRAWINGS

FIG. 6b is a lateral sectional explanatory view taken on line A—A in FIG. 6a;

FIG. 6c is a lateral sectional explanatory view taken on line B—B in FIG. 6a;

FIG. 6d is a lateral sectional explanatory view taken on line C—C in FIG. 6a;

DESCRIPTION OF THE PREFERRED EMBODIMENTS

An apparatus and a method according to the present invention will be described with reference to FIG. 1 and FIG. 2.

Figure 1A:
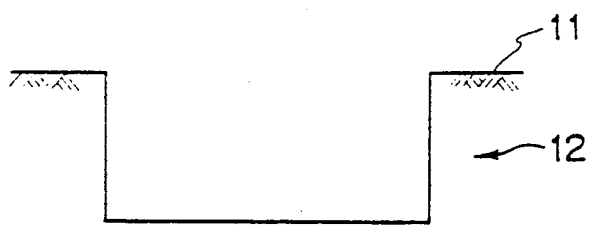
FIGS. 1(a–e) and FIGS. 2(a–b) are explanatory views for explaining the preferred embodiment of the method of the present invention.
Figure 1B:
Figure 1C:
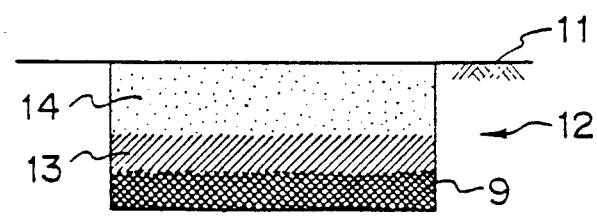

As a method of forming a water impermeable layer in the lower layer of the ground, soil in a layer to a predetermined depth for forming a water impermeable layer is removed by an arbitrary process (FIG. 1(a)), a material for forming the water impermeable layer is scattered or laid by a suitable process responsive to the state of the material on the surface of the exposed ground layer to form the water impermeable layer 9 (FIG. 1(b)), a water absorption polymer 13 having at least 0.5 cm of thickness is provided on the top of the formed water impermeable layer 9, and is covered with soil thereon 14 (FIG. 1(c)).

Figure 1D:
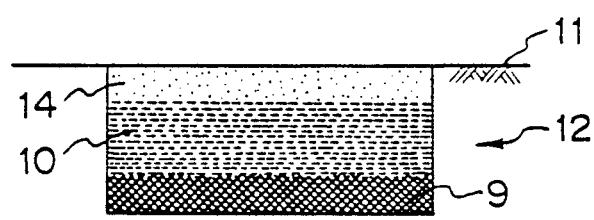

A soil layer 10 mixed with a water absorption polymer is provided on the top of the formed water impermeable layer 9, and is covered with soil thereon 14 (FIG. 1(d)).

Figure 1E:
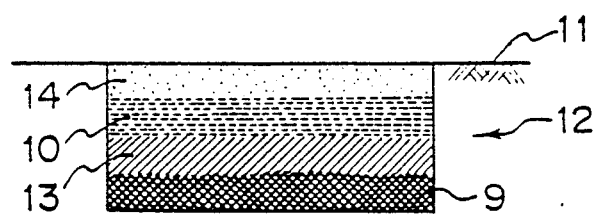

A water absorption polymer layer 13 having at least 0.5 cm of the thickness is provided on the top of the formed water impermeable layer 9, a soil layer 10 mixed with a water absorption polymer is provided further thereon, and covered with soil thereon 14 (FIG. 1(e)).

Figure 2A:
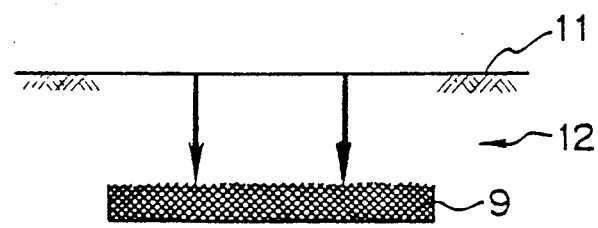
Figure 2B:
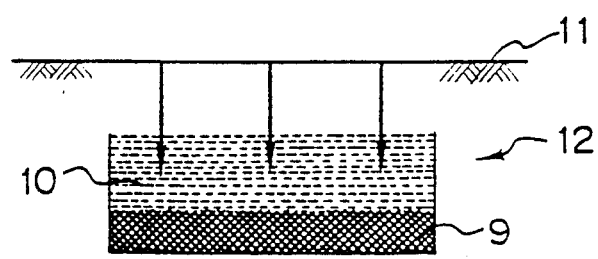

A material to be gelled is injected into soil to the ground layer of a predetermined depth to form the water impermeable layer 9 by a method ordinarily used for a soil stabilizing process without removing soil to form the water impermeable layer (FIG. 2(a)). Then, a powder-like water absorption polymer is injected together with high pressure air into the soil of the ground layer on the top of the formed water impermeable layer 9 to form a water absorption polymer mixed soil layer 10 (FIG. 2(b)).

Embodiments of a method and an apparatus used for executing the method according to the present invention will now be described in detail with reference to FIGS. 3 to 8.

FIG. 3 is an explanatory view showing illustrating stages in another embodiment of a method according to the present invention. FIG. 4 is an explanatory view depicting the state of ground treated according to the present invention.

As shown in FIG. 3, an essential portion of the injecting apparatus used for the method of the present invention comprises an end device 1, a swivel 2, a connecting tube 3, and an injection tube installing device 4, etc. The end device 1 is coupled to the swivel 2 by using the connecting tube 3, and assembled as an injection tube for use.

The connecting tube 3 has independent passages corresponding to the passages contained in the end device 1 and the swivel 2.

The injection tube installing device 4 supports the injection tube and has a power mechanism for rotating and vertically moving the injection tube.

The end device 1 comprises an end injection opening 5, a lower injection opening 6, an upper injection opening 7 and an agitating wing 8, and passages communicating with the injection openings. In the end device 1, cutting blades are attached to the distal end and the agitating wing 8 to perform drilling and injecting functions.

A drilling lubricant or a water impermeable material feeding tube 2-a, a water absorption polymer feeding tube 2-b, and a high pressure air feeding tube 2-c are respectively connected to the inlets of the swivel 2 to feed a drilling lubricant or a water impermeable material, a water absorption polymer and high pressure air are fed from the passages of the swivel 2 through the corresponding passages in the connecting tube 3 to the end device 1.

As the drilling lubricant, high pressure water and/or high pressure air is employed.

Figure 3A:
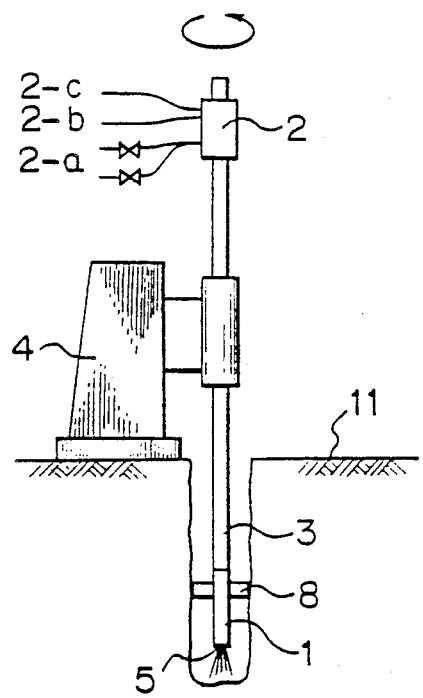
FIGS. 3(a–c) are explanatory view showing an executing sequence of steps according to the preferred embodiment of the method in the present invention.
Figure 4:
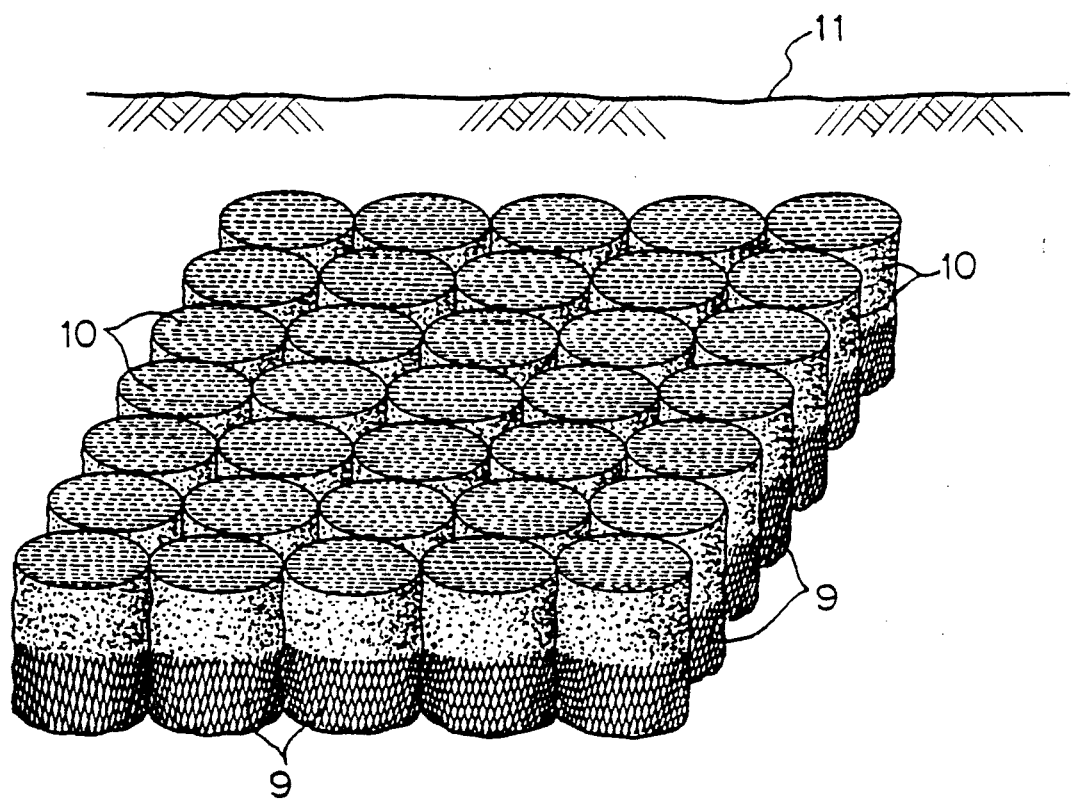
FIG. 4 is an explanatory view depicting the state of ground treated according to the present invention.

As shown in FIG. 3(a), in the step of excavating a hole for inserting the injection tube at a position in a predetermined depth in the ground, the injection tube is rotated and vertically moved up and down while injecting the drilling lubricant from the end injection opening 5 of the end device 1 to cut the ground by the cutting blades to drill the hole to the predetermined depth.

Figure 3B:
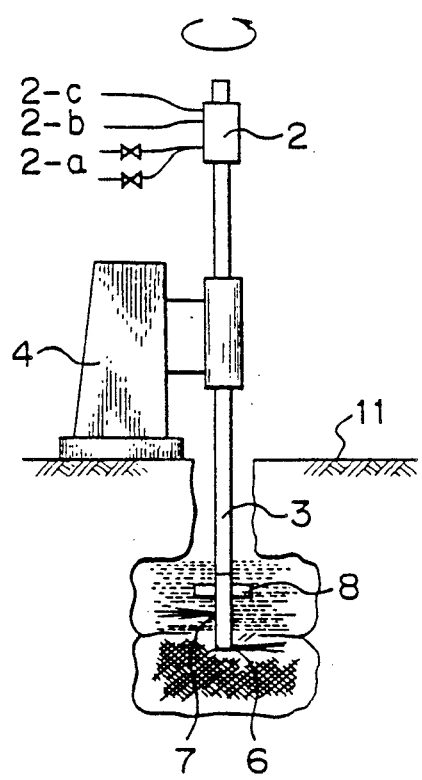

When the hole is drilled to the predetermined depth in the ground, the injection of the drilling lubricant from the end injection opening 5 is stopped. As shown in FIG. 3(b), the water impermeable material is injected from the lower injection opening 6, and the powder-like water absorption polymer is injected from the upper injection opening 7 into the ground.

When the injection tube is rotatably raised, the direction and position (level) of injecting the material to be injected from the lower and upper injection openings are moved, the water impermeable material injected from the lower injection opening 6 into the ground is injected while collapsing and agitating the soil of the columnar region around the end device 1, while the soil of the columnar region around the end device 1 is further agitating by the agitating wing 8 upon rotatable rising of the end device 1 in the ground cut ant agitated at the time of drilling by the agitating wing 8 attached to the end device 1. Accordingly, the water absorption polymer injected from the upper injection opening 7 can be dispersed and mixed into the soil of the columnar region farther from the periphery of the injection tube.

The injection tube is raised 0.7 to 1 m from the position started for injection while injecting the water impermeable material, and the thickness of the layer of the injected water impermeable material reaches 0.7 to 1 m, the injection of the water impermeable material is stopped. On the other hand, the injection of the water absorption polymer and the rotatable lifting of the injection tube are continued as required until the thickness of the layer mixed with the water absorption polymer arrived at the desired thickness, and when the suitable distance is raised, the injection of the water absorption polymer is stopped, and the injection tube is lifted.

Figure 3C:
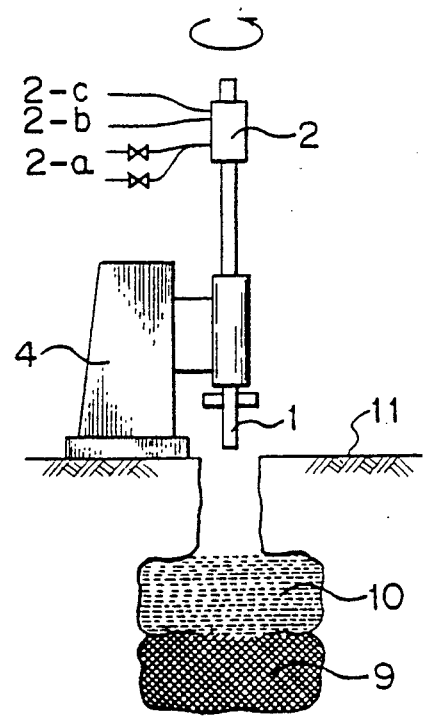

As the above-mentioned operation performed, as shown in FIG. 3(c), the soil is solidified together with the water impermeable material in the portion having 0.7 to 1 m of thickness of the lower layer of the columnar region having a diameter several times as large as the diameter of the injection tube around it with the position where the injection tube is inserted as the center to form the water impermeable layer 9, and the water absorption polymer mixed soil layer 10 is formed in the upper layer portion.

When the water impermeable material is injected into the ground from the lower injection opening 6, and the liquid including the water impermeable material is injected together with the high pressure air, it can be injected to a wider range, thereby forming a larger water impermeable layer.

The above-described operation is repeated at adjacent positions in the ground to be improved, one or two or more of a plurality of ground points are simultaneously executed. Thus, as shown in FIG. 4, water impermeable layers 9 are formed as continuous wall bodies in close contact with the soil solidified bodies formed adjacent to each other in the lower layer portion in the ground, and water absorption polymer mixed soil layers 10 are continuously formed in the upper layer.

Figure 5:
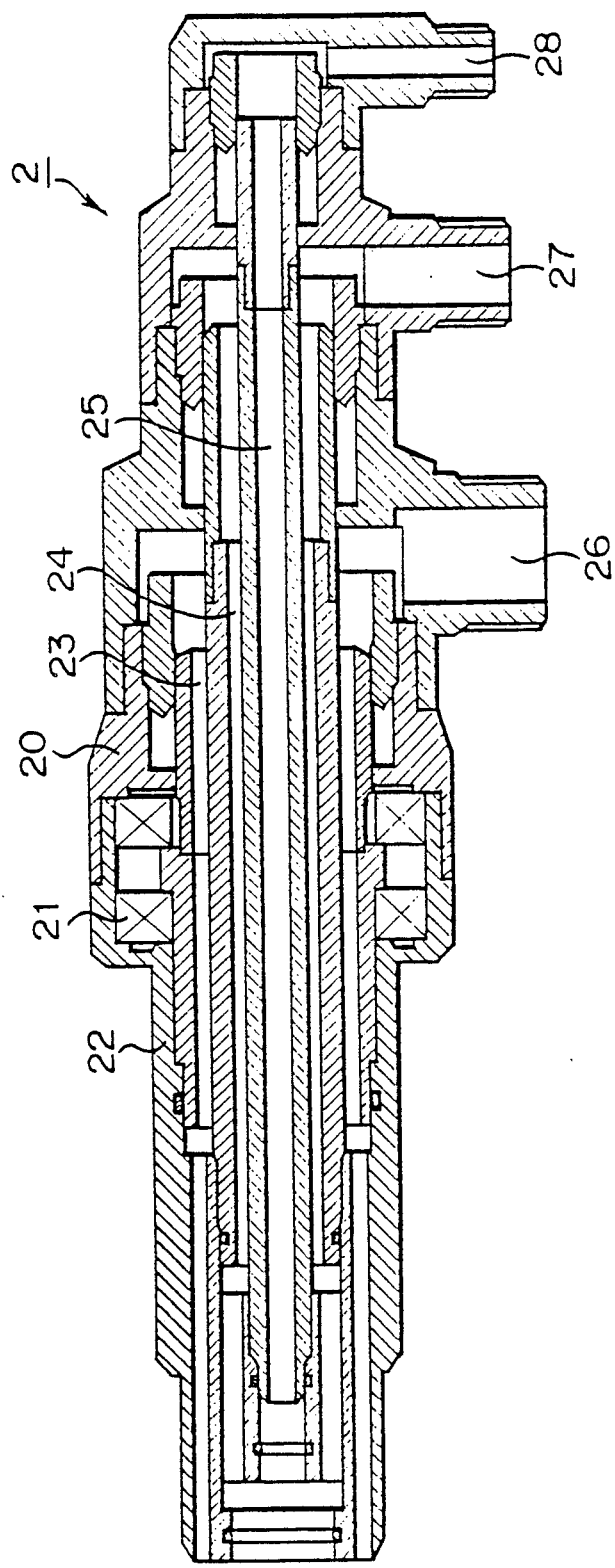
FIG. 5 is a longitudinal sectional explanatory view showing an example of a swivel used in the present invention.

FIG. 5 is a longitudinal sectional explanatory view of an example of a structure of an injecting swivel used for the apparatus of the present invention, and FIG. 6 is a longitudinal sectional explanatory view of an example of a structure of the end device.

As shown in FIG. 5, the swivel 2 is associated in combination with an outer cylinder 20 and an outer tube 22 rotatably attached through a bearing 21 to the outer cylinder 20. In the outer cylinder 20 and the outer tube 22, at least three independent passages 23, 24 and 25 are formed to communicate with inlets 26, 27 and 28, respectively. These inlets are connected through feed tubes 2-a, 2-b and 2-c to a drilling lubricant supplying device or a water impermeable material supplying device, a water absorption polymer supplying device and a high pressure air supplying device, respectively (not illustrated).

The high pressure air supplied from the high pressure air supplying device is fed as drilling lubricant at the time of drilling, and is fed as transporting medium for the water absorption polymer for at the time of injecting.

Figure 6A:
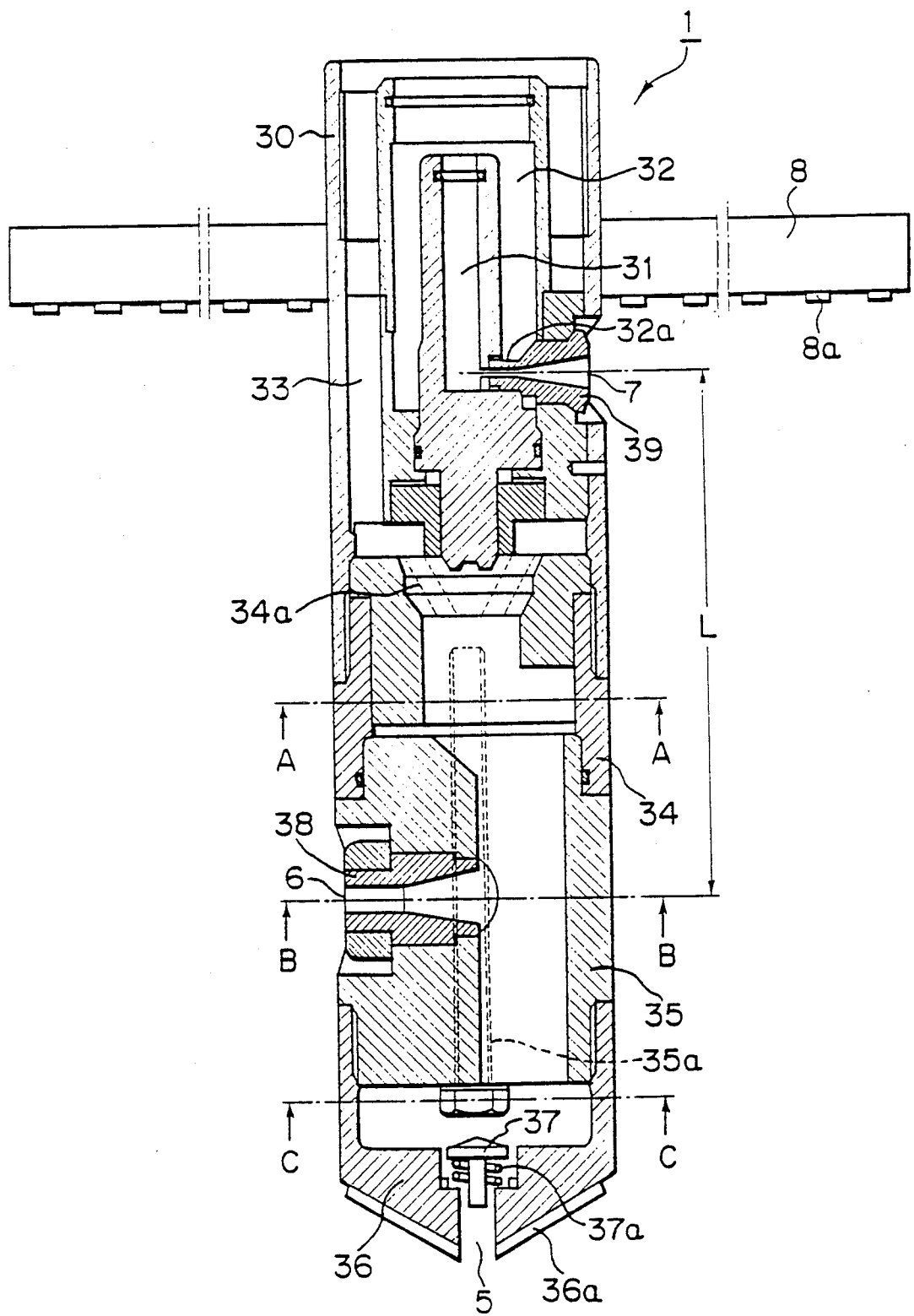
FIG. 6a is an explanatory sectional view showing an example of an injection tube end device used in the method of the present invention.
Figure 6B:
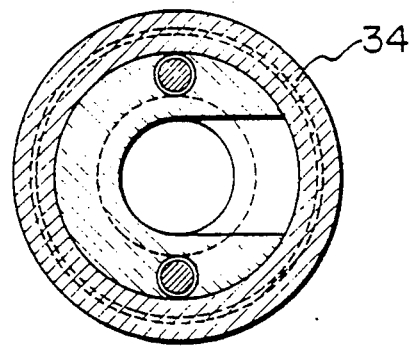
Figure 6C:
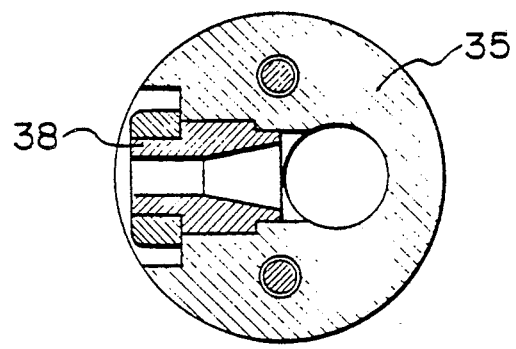
Figure 6D:
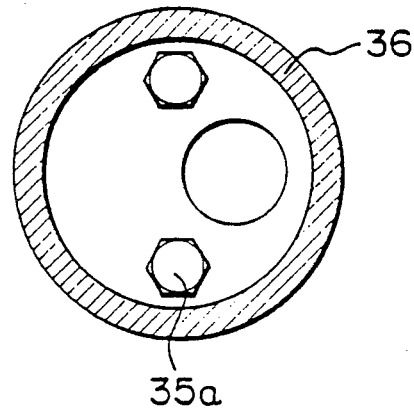

The end device 1 shown in FIG. 6a has an outer cylinder 30, in which at least three independent passages 31, 32 and 33 are provided therein.

The distal end of the outer cylinder 30 is clamped with a blocking nut 34, at which a water impermeable material supplying cylinder 35 is clamped via a bolt 35a. The water impermeable material supplying cylinder 35 communicates with the passage 33 in the outer cylinder 30 through a passage 34a provided in the blocking nut 34.

The distal end of the water impermeable material supplying cylinder 35 is engaged with a tip 36, at which a cutting blade 36a is mounted. An end injection opening 5 is formed at the tip 36, and a control valve 37 for controlling the injection from the injection opening is provided in the inlet of the end injection opening 5.

The control valve 37 is energized by a spring 37a not operated by the drilling lubricant feeding pressure to the proximal end side to open the end injection opening 5 so as not to disturb the downward injection of the drilling lubricant, but when the water impermeable material is fed under higher pressure than the operating pressure of the spring 37a, the control valve 37 is pressed down to block the end injection opening 5, thereby preventing the water impermeable material from injecting from the end injection opening 5.

The upper injection opening 7 is provided at the position near the proximal end side at the sidewall of the outer cylinder 30 to communicate with the passage 31 for feeding the high pressure air. The passage 32 for feeding the water absorption polymer communicates with the upper injection opening 7 through the water absorption polymer supply hole 32a. Thus, the powder-like water absorption polymer supplied from the supply hole 32a is sucked by an ejector mechanism via the high pressure air supplied from the passage 31, and is injected by means of the air jet.

The lower injection opening 6 is formed for injecting the water impermeable material at the sidewall of the water impermeable material supplying cylinder 35.

A distance L between the levels of the upper injection opening 7 and the lower injection opening 6 is about 0.7 m or longer, and determined in response to the position of the water absorption polymer mixed soil layer 10 formed in the region of the upper position of the water impermeable layer 9. The distance L is adjusted by preparing blocking nuts having different lengths in axial direction selecting suitable one from them and fitting it.

In order to remove the water impermeable material supplying cylinder 35, the tip 36 is disengaged, and the bolt 35a is removed.

Nozzle tips 38 or 39 corresponding to the material to be injected are attached to the respective injection openings. The nozzle tips may be made of iron, and when a high corrosion resistance is required, it may be made of stainless steel, fluorineresin, ceramic, and replaced as required.

When the injection directions of the high pressure jet stream are the same, a large moment is generated in a single direction and it may be inconvenient to vertically move the injection tube while it is rotating.

Therefore, when the number of the upper and lower injection openings is two in total sum, the nozzle tips are preferably disposed at 180° separation in the circumferential direction of the end device 1. When the number of the upper and lower injection openings is three, the nozzle tips are preferably disposed at 120° separation in the circumferential direction. Or, a plurality of the upper and lower injection openings are provided, and the injection openings of the same type may be balanced are evenly separated. In any case, the injection openings may be disposed in a balanced way.

Two or more agitating wings 8 are provided at the positions near above the upper injection opening 7 at the sidewall of the outer cylinder 30, and cutting blades 8a of suitable number are provided at a suitable interval on the lower surface of the agitating wings 8. Thus, when the injection tube is rotated in the ground, the soil around the end device 1 is cut and agitated to easily disperse and mix the water absorption polymer injected from the upper injection opening 7 into soil.

When the swivel 2 is connected to the end device 1 by using the connecting tube 3 having the independent passages of corresponding number to be associated as the injection tube, the passages in the swivel 2 are connected to the corresponding passages of the end device 1 through the passages in the connecting tube 3.

At the time of drilling, the drilling lubricant feeding tube 2-a is connected to the inlet 26 of the swivel 2 (FIG. 3(a)), the drilling lubricant is fed from the inlet 26, the passage 23 of the swivel 2 to the end device 1 through the corresponding passage in the connecting tube 3, and introduced into the water impermeable material supplying cylinder 35 through the passages 33, 34a of the end device 1. The drilling lubricant fed under the pressure for not operating the control valve 37 is injected from the end injection opening 5 and the lower injection opening 6.

When the drilling is finished and the operation is shifted to an injecting stage, material supply to the feeding tube 2-a connected to the inlet 26 of the swivel 2 is switched from the drilling lubricant to the water impermeable material, the water absorption polymer feeding tube 2-b is connected to the inlet 27, and the high pressure air feeding tube 2-c is connected to the inlet 28 (FIG. 3(b)).

The water impermeable material is fed from the feeding tube 2-a through the inlet 26 of the swivel 2, the passage 23 and the corresponding passage in the connecting tube 3 to the end device 1, and introduced through the passages 33, 34a in the end device 1 to the water impermeable material supplying cylinder 35. The water impermeable material fed under higher pressure than the operating pressure of the control valve 37, press down the control valve 37 to block the end injection opening 5, and is injected from the lower injection opening 6.

The water absorption polymer is fed from the feeding tube 2-b through the inlet 27, the passage 24 of the swivel 2 and the corresponding passage in the connecting tube 3 to the end device 1, and injected through the passages 32, 32a of the end device 1 from the upper injection opening 7. The water absorption polymer fed via the feeding tube 2-b is preferably fed together with the high pressure air.

The high pressure air is fed from the feeding tube 2-c through the inlet 28, the passage 25 of the swivel 2 and the corresponding passage in the connecting tube 3 to the end device 1, and fed through the passage 31 of the end device 1 to the upper injection opening 7.

Another embodiment of the apparatus for executing the method of the present invention will now be described.

The injection apparatus used in this embodiment comprises an end device having at least two independent passages in a tube. In FIG. 7, an example of a double wall tube is shown, but an end device used in the present invention is not limited to just the double wall tube type.

As shown in FIG. 7, an end device 1 has an outer cylinder 40, which has at least two independent passages 41 and 42 therein.

The passage 41 is connected to a spool valve cylinder 43 mounted in the outer cylinder 40, and a passage 43a communicating with a passage 42 is provided at a position near the distal end side of the sidewall of the spool valve cylinder 43.

In the spool valve cylinder 43 is provided a spool valve 44 energized to the proximal end side (upward) of the end device 1 by a spring 45, and a communication hole 44a is provided at a position communicating with the passage 43a when the spool valve 44 is moved downward (to the distal end side) at the valve body of the spool valve 44.

A lower injection opening 6 communicating with the communication hole 44a is provided at a position near the distal end side, and an upper injection opening 7 is provided at a position near the proximal end side, respectively, of the sidewall to communicate with the exterior of the spool valve cylinder 43. A distance L between the levels of the upper injection opening 7 and the lower injection opening 6 is preferably 0.7 m or longer.

In order to improve the material injection state, high pressure injection nozzle tips 38 as shown in FIG. 6 are preferably attached to the lower and upper injection openings 6 and 7.

At the sidewall of the outer tube 40 are provided two or more agitation wings 8 at the positions near the proximal end side near the upper injection opening 7, and cutting blades 8a of suitable number are provided at suitable intervals on the lower surface of the agitating wing 8.

A check valve body 50 is engaged with the digital of the outer tube 40, a passage 51 communicating with the passage 42 in the outer tube 40 is provided at the proximal end side of the check valve body 50, and a passage 52 is provided in the check valve body 50.

A support 55 having a plurality of passages 53 for supporting a check valve 54 is engaged in the check valve body 50. The passage 53 in the support 55 communicates with the passage 52.

The check valve 54 is energized to the proximal end side (upward) of the check valve body 50 by a spring 56.

A bit 60 welded with hard alloy 60a is engaged with the distal end side of the check valve body 50.

The end of the bit 60 is formed with an end injection opening 5.

In the step of excavating a hole for inserting an injection tube using the end device 1 as shown in FIG. 7 into a position in a desired depth into the ground (FIG. 3(a)), the injection tube is rotatably moved vertically up and down while injecting the drilling lubricant from the end injection opening 5 of the end device 1, and the ground is cut by the bit to drill the ground in a desired depth.

The drilling lubricant is fed from a first feeding tube connected to the first inlet of a two-way swivel (not illustrated) to the end device 1 through the corresponding passage in the connecting tube 3.

A two-way swivel of the type disclosed in Japanese Utility Model Laid-Open No. 55-150835 may be employed.

In this step, the drilling lubricant is fed to the passage 42 of the end device 1, and the passage 41 is not pressurized.

Figure 7A:
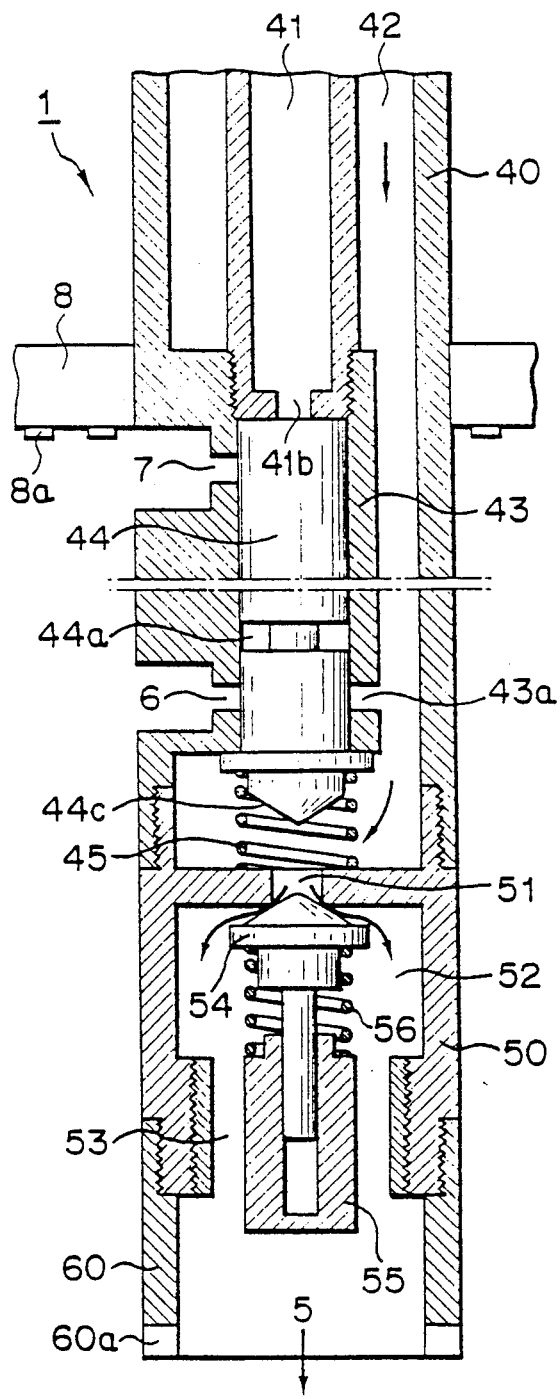
FIGS. 7(a–b) are longitudinal sectional explanatory views showing other examples of injection tube end devices used in the present invention.

When the passage 41 is not pressurized, as shown in FIG. 7(a), the spool valve 44 is pressed to the proximal end side of the end device 1 by the tension of the spring 45, and is moved to a position for blocking, respectively, the passage 41 by the proximal end face of the valve body, and the passage 43a by the side face of the valve body. Thus, the lower and upper injection openings 6 and 7 are blocked by the side face of the valve body of the spool valve 44, and are sequentially interrupted respectively from the passages 42 and 41.

In this state, the drilling lubricant is fed to the passage 42 under pressure exceeding the tension of the spring 56 for energizing the check valve 54, the check valve 54 is pressed to the distal end side to open the passage 51, and the drilling lubricant is injected from the end injection opening 5 through the passage 52 and 53, thereby facilitating the cutting of the ground by the bit.

When the drilling is finished and the operation is shifted to an injecting material supply to the first feeding tube connected to the first inlet of the swivel is switched from the drilling lubricant to the water impermeable material, and the water absorption polymer is fed together with high pressure air to the second inlet of the swivel from the second feeding tube.

Figure 7B:
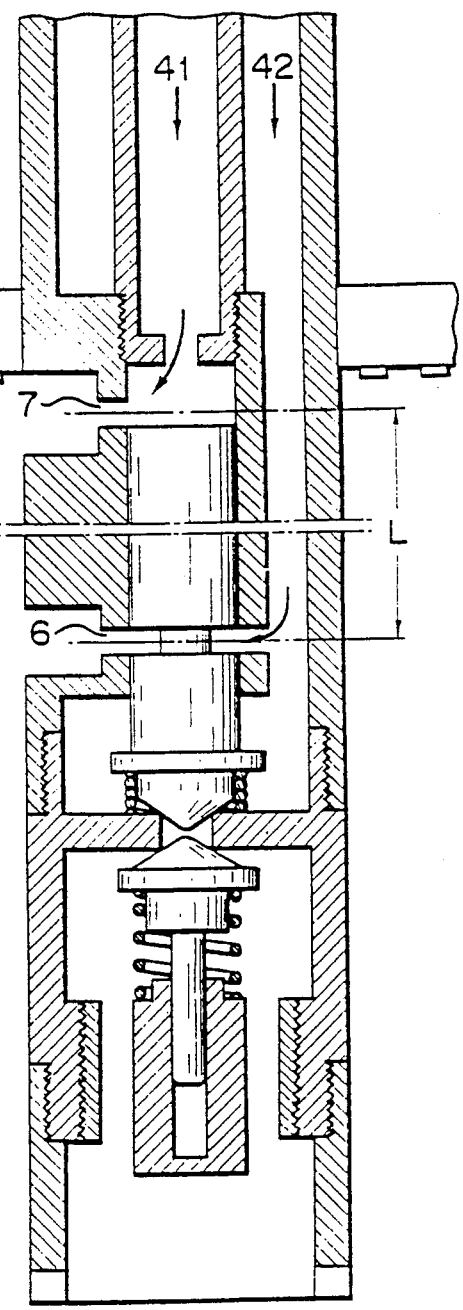

When the water absorption polymer is fed together with high pressure air under the pressure exceeding the tension of the spring 45 for energizing the spool valve 44, as shown in FIG. 7(b), the spool valve 44 is pressed to the distal end side, and is moved to a position for blocking the passage 51 by the end face 44c of the valve body and for opening the upper injection opening 7.

The water absorption polymer is injected from the opened upper injection opening 7.

In this state, the passage 51 is blocked from the proximal end side by the end face 44c of the spool valve 44 to block the passage 42. Accordingly, the water impermeable material fed to the passage 42 is not fed into the passage 51, but is injected from the lower injection opening 6 through the passages 43a and 44a communicated by the movement of the spool valve 44.

On the other hand, the passage 51 is blocked from the distal end side by the check valve 54, and the passage 53, 52 are interrupted from the passage 42. Thus, it can prevent the water, gravel, etc., from flowing backward into the passage 42 out of the injection tube.

Figure 8A:
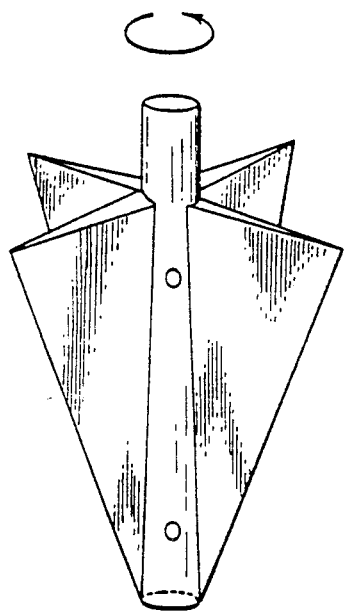
FIGS. 8(a–c) are explanatory views showing some examples of an agitating wing provided at the end device used in the present invention.
Figure 8B:
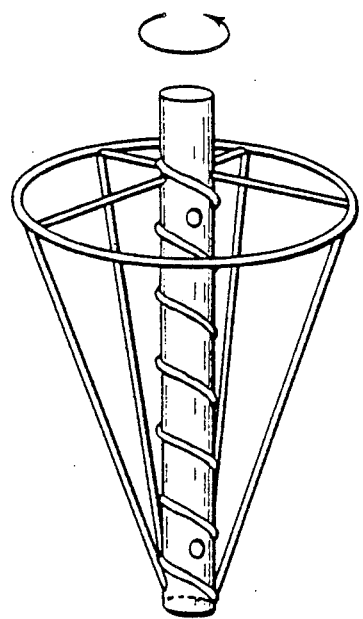
Figure 8C:
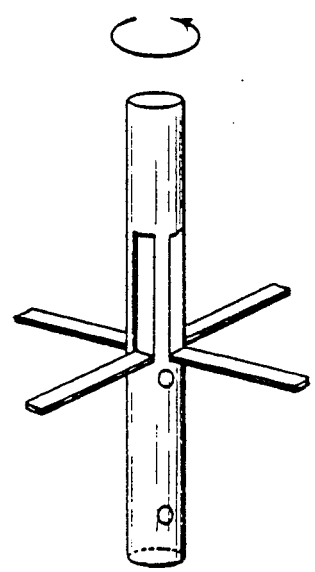

The agitating wings 8 provided at the end device 1 are arbitrary in size, and are not limited to a rod shape as shown in FIGS. 6 and 7, but may be formed in various shapes as shown in FIG. 8 indicated in FIGS. 8a-8c.

FIG. 8(a) shows an example of a triangular agitating wing 8 provided on the outer surface of the end device 1. Cutting blades are provided at the end of the wing, the diameter of the wing is larger at the upper portion (near the upper injection opening 7) while smaller at the lower portion (near the distal end side of the end device 1), thereby cutting in an inverted triangular conical shape when the end device is rotated to easily excavate and agitate a sandy soil layer.

FIG. 8(b) shows a spiral cutting blade attached to the outer surface of the end device 1 and a cage-like agitating wing 8 associated in a framework in a inverted triangular conical shape with a round rod. When the end device is rotated, the soil in the ground is accelerated to be excavated by the spiral cutting blade, stirred by the cage-like agitating wing, thereby preferably mixing the soil and the material injected.

Further, agitating wings folded on the outer surface of the end device at the wings at the time of excavating the ground and opened at the wings at the time of injecting as disclosed in Japanese Patent Publication No. 48-25768 (FIG. 8(c)), or those disclosed in Japanese Utility Model Laid-Open No. 54-166005, Japanese Patent Laid-Open Nos. 56-28924, 59-161513, etc. may be employed.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A method of improving the water retention characteristics of soil in dry ground with a water absorption polymer, comprising the steps of
   forming a water impermeable layer below a surface of the ground at a selected location; and
   mixing a water absorption polymer in the soil above an upper portion of said water impermeable layer.

2. The method according to claim 1, wherein:
   to form said water impermeable layer, an injection tube is inserted from the surface of the ground and an impermeable material is injected from an opening formed at the end portion of the injection tube.

3. The method according to claim 2, wherein:
   said injection tube is inserted from the surface of the ground and an impermeable material is injected from the opening formed at the end portion of the injection tube to form a water impermeable layer; and a water absorption polymer is injected from an injection opening, formed above said opening of said injection tube into the ground, to form a water retention characteristics improving layer.

4. The method according to claim 3, wherein:

continuous formation of the water impermeable layer and the water retention characteristics improving layer is executed at a number of different positions of the ground separated in a horizontal direction.

5. The method according to claim 2, wherein:

in the injection, to improve water retention characteristics of the ground above the water impermeable layer, a water absorption polymer is injected from an injection opening of said injection tube inserted from the surface of the ground into the ground, and agitation of soil and the injected water absorption polymer is provided at least in an injected region in the ground.

6. The method according to claim 5, wherein:

an agitating wing is provided integrally with said injection tube to generate said agitation and said injection tube is rotated during injecting of the water absorption polymer thereby.

7. The method according to claim 6, wherein:

said agitating wing is folded along an axial direction of said injection tube during insertion of the injection tube into the ground and is laterally extended from the injection tube for said agitating.

8. The method according to claim 1 wherein:

said water impermeable layer is formed in the range of 2 to 10 m from the ground surface.

9. An apparatus for improving the ground by forming a water impermeable layer at a subsurface level of the ground and for mixing a water absorption polymer in soil above an upper portion of said water impermeable layer, comprising:

an injection tube, inserted into the ground to a predetermined depth, having at least two independent passages provided therein to enable respective flows therethrough, wherein one end of a first passage of said independent passages has an opening to a side for sidewise direction of injecting of a first material therethrough into the ground, one end of a second passage of said independent passages is opened to a side for injecting of a second material therethrough at a position near a base end of the injecting tube at a distance of at least 0.7 m from said opening of the first passage;

agitating wing means projecting sidewisely is provided near the opening of the second passage, for agitating adjacent soil; and a power mechanism for rotating and vertically moving the injection tube with respect to the ground.

* * * * *